US009628870B2

(12) United States Patent
Daub et al.

(10) Patent No.: US 9,628,870 B2
(45) Date of Patent: Apr. 18, 2017

(54) VIDEO SYSTEM WITH CUSTOMIZED TILING AND METHODS FOR USE THEREWITH

(71) Applicant: ViXS Systems, Inc., Toronto (CA)

(72) Inventors: Sally Jean Daub, Toronto (CA); John Pomeroy, Markham (CA); Indra Laksono, Richmond Hill (CA)

(73) Assignee: ViXS Systems, Inc., Toronto (CA)

( * ) Notice: Subject to any disclaimer, the term of this patent is extended or adjusted under 35 U.S.C. 154(b) by 2 days.

(21) Appl. No.: 14/678,232

(22) Filed: Apr. 3, 2015

(65) Prior Publication Data

US 2015/0281780 A1   Oct. 1, 2015

Related U.S. Application Data

(63) Continuation-in-part of application No. 14/590,303, filed on Jan. 6, 2015, which is a continuation-in-part of application No. 14/477,064, filed on Sep. 4, 2014, and a continuation-in-part of application No. 14/217,867, filed on Mar. 18, 2014.

(51) Int. Cl.
  *H04H 60/33* (2008.01)
  *H04N 21/81* (2011.01)
  *H04N 21/4415* (2011.01)
  *H04N 21/482* (2011.01)
  *H04N 21/485* (2011.01)

(52) U.S. Cl.
  CPC ....... *H04N 21/812* (2013.01); *H04N 21/4415* (2013.01); *H04N 21/485* (2013.01); *H04N 21/4821* (2013.01)

(58) Field of Classification Search
  CPC .......... H04N 21/4312; H04N 21/4858; H04N 21/4415; H04N 21/812
  USPC .......................................................... 725/10
  See application file for complete search history.

(56) References Cited

U.S. PATENT DOCUMENTS

| | | | | |
|---|---|---|---|---|
| 5,945,988 A | * | 8/1999 | Williams | G11B 27/105 348/E17.005 |
| 2004/0098462 A1 | * | 5/2004 | Horvitz | G05B 19/404 709/207 |
| 2006/0093998 A1 | * | 5/2006 | Vertegaal | G06F 3/011 434/236 |
| 2006/0140495 A1 | * | 6/2006 | Keeney | H04N 19/115 382/239 |
| 2009/0064225 A1 | * | 3/2009 | Lee | H04N 5/44543 725/39 |
| 2010/0242074 A1 | * | 9/2010 | Rouse | H04L 12/588 725/100 |
| 2010/0306805 A1 | * | 12/2010 | Neumeier | H04N 5/44591 725/60 |
| 2010/0319034 A1 | * | 12/2010 | Mountain | H04N 5/44513 725/68 |

(Continued)

*Primary Examiner* — Nathan Flynn
*Assistant Examiner* — Cynthia Fogg
(74) *Attorney, Agent, or Firm* — Garlick & Markison; Bruce E. Stuckman

(57) ABSTRACT

A tile processor is configured to analyze sensor data to identify the at least one viewer and to generate tile configuration data in response to the identification of the at least one viewer that indicates a tiled partitioning of a screen display into a plurality of tiled regions. An A/V player generates tiled display data for display of the at least video program on a display device in accordance with the tile configuration data.

10 Claims, 9 Drawing Sheets

(56) References Cited

U.S. PATENT DOCUMENTS

| | | | |
|---|---|---|---|
| 2012/0233059 A1* | 9/2012 | Buck | G06F 3/013 |
| | | | 705/37 |
| 2013/0290993 A1* | 10/2013 | Cheung | H04N 21/4143 |
| | | | 725/10 |
| 2013/0347018 A1* | 12/2013 | Limp | H04N 21/4826 |
| | | | 725/19 |
| 2014/0007148 A1* | 1/2014 | Ratliff | H04N 21/251 |
| | | | 725/12 |
| 2014/0096152 A1* | 4/2014 | Ferens | H04N 21/2668 |
| | | | 725/12 |
| 2014/0123162 A1* | 5/2014 | Karlsson | H04N 21/4331 |
| | | | 725/12 |

* cited by examiner

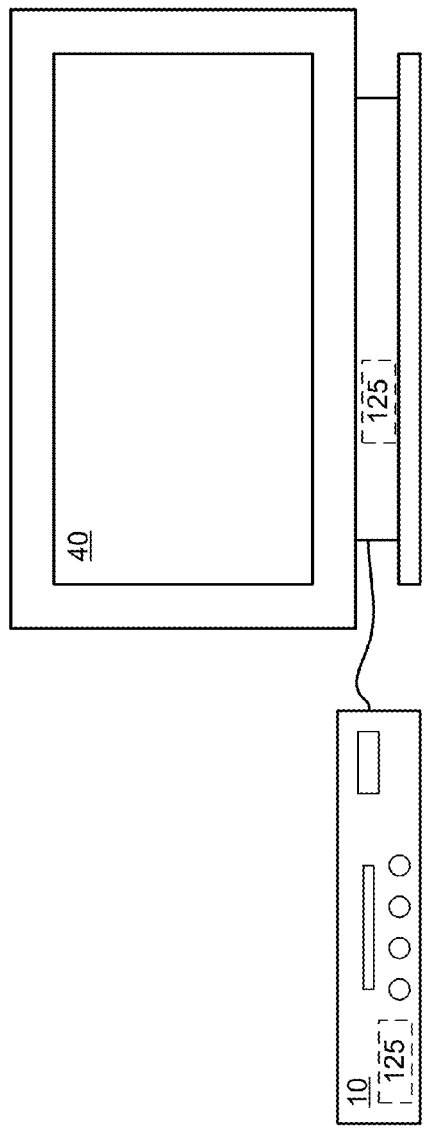
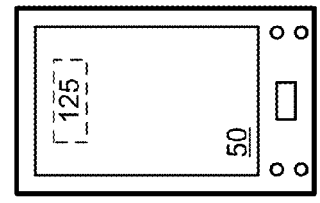
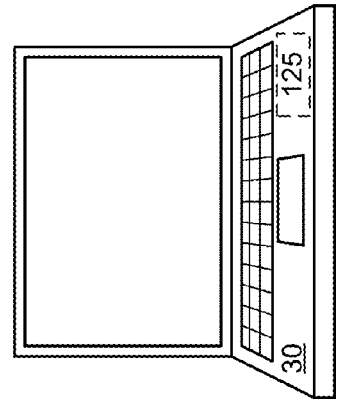
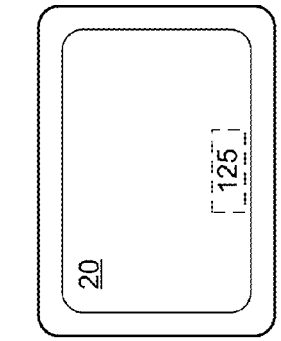
FIG. 1
FIG. 2
FIG. 3
FIG. 4

VIDEO SYSTEM WITH CUSTOMIZED TILING AND METHODS FOR USE THEREWITH

CROSS REFERENCE TO RELATED PATENTS

The present U.S. Utility patent application claims priority pursuant to 35 U.S.C. §120 as a continuation-in-part of U.S. Utility application Ser. No. 14/590,303, entitled "AUDIO/VIDEO SYSTEM WITH INTEREST-BASED AD SELECTION AND METHODS FOR USE THEREWITH", filed Jan. 6, 2015, which is a continuation-in-part of U.S. Utility application Ser. No. 14/217,867, entitled "AUDIO/VIDEO SYSTEM WITH USER ANALYSIS AND METHODS FOR USE THEREWITH", filed Mar. 18, 2014, and claims priority pursuant to 35 U.S.C. §120 as a continuation-in-part of U.S. Utility application Ser. No. 14/477,064, entitled "VIDEO SYSTEM FOR EMBEDDING EXCITEMENT DATA AND METHODS FOR USE THEREWITH", filed Sep. 4, 2014, all of which are hereby incorporated herein by reference in their entirety and made part of the present U.S. Utility patent application for all purposes.

TECHNICAL FIELD

The present disclosure relates to audio/video systems that process and present audio and/or display video signals.

DESCRIPTION OF RELATED ART

Modern users have many options to view audio/video programming. Home media systems can include a television, a home theater audio system, a set top box and digital audio and/or A/V player. The user typically is provided one or more remote control devices that respond to direct user interactions such as buttons, keys or a touch screen to control the functions and features of the device. Audio/video content is also available via a personal computer, smartphone or other device. Such devices are typically controlled via a buttons, keys, a mouse or other pointing device or a touch screen.

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. Further, encoding algorithms have been developed primarily to address particular issues associated with broadcast video and video program distribution.

BRIEF DESCRIPTION OF THE SEVERAL VIEWS OF THE DRAWINGS

FIGS. 1-4 present pictorial diagram representations of various video devices in accordance with embodiments of the present disclosure.

DETAILED DESCRIPTION

FIGS. 1-4 present pictorial diagram representations of various video devices in accordance with embodiments of the present disclosure. In particular, device 10 represents a set top box with or without built-in digital video recorder functionality or a stand-alone digital video player such as an internet video player, Blu-ray player, digital video disc (DVD) player or other video player. Device 20 represents an Internet tablet. Device 30 represents a laptop, netbook or other portable computer. Device 40 represents a video display device such as a television or monitor. Device 50 represents a smartphone, phablet or other mobile communication device.

The devices 10, 20, 30, 40 and 50 each represent examples of electronic devices that incorporate one or more elements of a system 125 that includes features or functions of the present disclosure. While these particular devices are illustrated, system 125 includes any device or combination of devices that is capable of performing one or more of the functions and features described in conjunction with FIGS. 5-14 and the appended claims.

Figure 5:
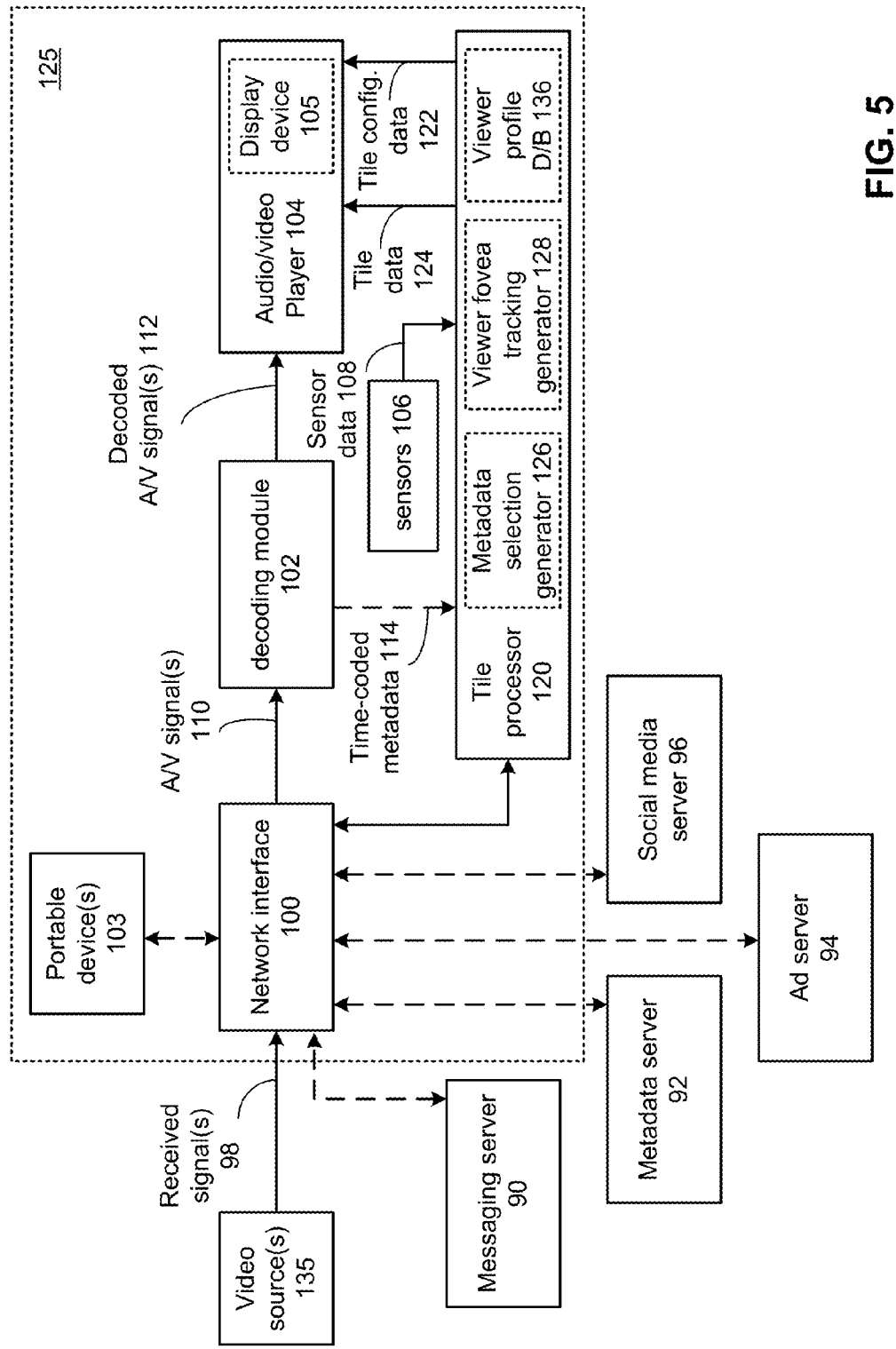
FIG. 5 presents a block diagram representation of a system 125 in accordance with an embodiment of the present disclosure.

FIG. 5 presents a block diagram representation of a system in accordance with an embodiment of the present disclosure. In an embodiment, system 125 includes a network interface 100, such as a television receiver, cable television receiver, satellite broadcast receiver, broadband modem, a Multimedia over Coax Alliance (MoCA) interface, Ethernet interface, local area network transceiver, Bluetooth, 3G or 4G transceiver and/or other information receiver or transceiver or network interface that is capable of receiving one or more received signal(s) 98 from one or more video source(s) 135 and extracting one or more audio/video signal(s) 110. In addition to receiving received signal(s) 98, the network interface 100 can provide an Internet connection, local area network connection or other wired or wireless connection to a messaging server 90, metadata server 92, ad server 94 and/or social media server 96 and optionally one or more portable devices 103 such as tablets, smart phones, lap top computers or other portable devices. While shown as a single device, network interface 100 can be implemented by two or more separate devices, for example, to receive the received signal(s) 98 via one network and/or to communicate with portable devices 103 and messaging server 90, metadata server 92, ad server 94 and/or social media server 96 via one or more other networks.

The received signals(s) 98 can contain one or more video programs in an audio/video signal, such as a broadcast video signal, a multicast video signal, a unicast video signal, streaming video signal or other video signal that has been transmitted over a wireless medium, either directly or through one or more satellites or other relay stations or through a cable network, optical network or other transmission network, without or without an accompanying audio signal. In addition, received signals(s) 98 can be generated from a stored video file, played back from a recording medium such as a magnetic tape, magnetic disk or optical disk, and can include a broadcast video signal, a multicast video signal, a unicast video signal, streaming video signal or other video signal that is transmitted over a public or private network such as a local area network, wide area network, metropolitan area network or the Internet.

Received signals(s) 98 can include a compressed digital video signal complying with a digital video codec standard such as H.264, MPEG-4 Part 10 Advanced Video Coding (AVC), VC-1, H.265, or another digital format such as a Motion Picture Experts Group (MPEG) format (such as MPEG1, MPEG2 or MPEG4), QuickTime format, Real Media format, Windows Media Video (WMV) or Audio Video Interleave (AVI), etc. When the received signals(s) 98 include a compressed digital video signal, the decoding module 102 or other video codec decompresses the audio/video signals(s) 110 to produce a decoded audio/video signals(s) 112 suitable for display by a video display device 105 of audio/video player 104 that operates under the control of the viewer(s) to create an optical image stream of the video programs contained in the decoded audio/video signals(s) 112. In an embodiment the display device includes a high resolution display, such as a high definition display, an ultra high definition 4K display or 8K display or other high resolution display that can be partitioned into multiple viewing tiles.

When the received signals(s) 98 include a compressed digital audio signal, the decoding module 102 can decompress the audio/video signals(s) 110 and otherwise process the audio/video signals(s) 110 to produce a decoded audio signal suitable for presentation by an audio player included in audio/video player 104. The decoded audio/video signals(s) 112 can include a high definition media interface (HDMI) signal, digital video interface (DVI) signal, a composite video signal, a component video signal, an S-video signal, and/or one or more analog or digital audio signals.

When A/V signals(s) 110 are received and the decoded video signals(s) 112 are produced in a digital video format, the digital video signal may be optionally scrambled or encrypted, may include corresponding audio and may be formatted for transport via one or more container formats. Examples of such container formats are encrypted Internet Protocol (IP) packets such as used in IP TV, Digital Transmission Content Protection (DTCP), etc. In this case the payload of IP packets contain several transport stream (TS) packets and the entire payload of the IP packet is encrypted. Other examples of container formats include encrypted TS streams used in Satellite/Cable Broadcast, etc. In these cases, the payload of TS packets contain packetized elementary stream (PES) packets. Further, digital video discs (DVDs) and Blu-Ray Discs (BDs) utilize PES streams where the payload of each PES packet is encrypted. When the received signals(s) 98 are scrambled or encrypted, the decoding module 102 further operates to descramble and/or decrypt the received signals(s) 98 to produce the decoded audio/video signals(s) 112.

In an embodiment, the decoding module 102 not only decodes the A/V signal(s) 110 but also includes a pattern recognition module to detect patterns of interest in the video signal and to generate time-coded metadata 114 that indicates patterns and corresponding features, such as people, objects, places, activities or other features as well as timing information that correlates the presence or absence of these people, objects, places, activities or other features in particular images in the decoded A/V signal(s) 112. Examples of such a decoding module 102 is presented in conjunction with the U.S. Published Application 2013/0279603, entitled, VIDEO PROCESSING SYSTEM WITH VIDEO TO TEXT DESCRIPTION GENERATION, SEARCH SYSTEM AND METHODS FOR USE THEREWITH, the contents of which are incorporated herein by reference for any and all purposes. In addition or in the alternative, the decoding module 102 extracts time coded metadata 114 that was already included in the A/V signal(s) 110. For example, the A/V signal(s) 110 can have the time coded metadata 114 embedded as a watermark or other signal in the video content itself, or be in some different format that includes the video content from the received signal 98 and the time-coded metadata 114.

The system 125 includes one or more sensors 106 that generate sensor data 108 corresponding to a viewing of video program(s) via the A/V player 104 by one or more viewers. The viewer sensor 106 can include a digital camera such as a still or video camera that is either a stand-alone device, or is incorporated in any one of the devices 10, 20, 30 or 40 or other device that generates the sensor data 108 that includes image data. In addition or in the alternative, the viewer sensor(s) 106 can include an infrared sensor, thermal imager, background temperature sensor or other thermal imaging sensor, an ultrasonic imaging sensor or other sonar-based sensor, and/or other sensors for generating sensor data 108 that can be used by the tile processor 120 In addition or in the alternative, image data can be generated by cameras associated with one or more portable devices 103 associated with the viewer(s).

The tile processor 120 analyzes the sensor data 108 to determine the presence of the viewer(s), to identify the viewer(s) and to generate tile configuration data 122 in response to the identification of the viewer(s). The tile configuration data 122 indicates a tiled partitioning of a screen display into a plurality of tiled regions. The A/V player 104 generates tiled display data for display of the video program(s) on a display device in accordance with the tile configuration data 122.

The tile processor 120 can further generate tile data 124 in response to the identification of the viewer(s). In an embodiment, the tile processor 120 includes a metadata selection generator 126 that selects time coded metadata 114 or metadata associated with the video programs(s) retrieved from a metadata source 92 for display as tile data 124 in accordance with the viewer(s) that are identified. The tile data 124 can also include other media such as advertisements, messaging or social media from at least one secondary tile data source, such as an ad server 94, messaging server 90, or social media server 96. In this fashion, the plurality of tiled regions of the screen display can include one or more video regions for display of one or more video programs, and one or more other regions for display of the tile data 124.

In an embodiments, the tile processor 120 also includes a viewer fovea tracking generator 128 that generates fovea tracking data corresponding to the viewer(s) that indicates which or the particular tiled regions of the screen display correspond to a region of viewer focus for each of viewer(s)—i.e. which of the tiled regions each viewer is watching at any given time. When the particular tiled regions corresponding to the region of viewer focus correspond to a video region, the metadata selection generator 126 can select metadata corresponding to the particular video program currently displayed in that tiled region. In this fashion, if multiple video programs are displayed in different tiled regions, metadata can be selected that corresponds to the video program or programs that are currently being followed by the viewer or viewers. In addition or in the alternative, the tile processor 120 can also adjust the tile configuration data 122 in response to the fovea tracking data to further adapt to the particular tiled region or regions that are currently being watched by the viewer(s).

In an embodiment, the tile processor 120 includes a viewer profile database 136 that stores viewer profile data for one or more viewers. The viewer profile data can include viewer images of know viewers and/or other viewer data that can be used to identify the viewers based on the sensor data 108, as well as viewer demographic information, preferred tile configurations for each viewer, portable device information for the portable devices 103 associated with the viewers, and/or other preferences and profile data. In an embodiment, the tile processor 120 analyzes the sensor data 108 or portable devices 103 in use in the viewing area to identify the viewer(s) based a comparison of the sensor data 108 or portable device 103 to viewer profile data stored in a viewer profile database 136. The tile processor 120 can generate the tile configuration data 122 based on the preferred tile configuration for one or more viewers that are currently identified as being in the viewing area of the A/V player 104. Another potential viewer identification method is that where the portable device 103 is a smartphone or tablet that often is only used by a unique user, the presence of an interface application on the device, as a portal into the system 125 can also be used to identify a unique user, as commands or navigation requests entered into the portable device 103 can be used to improve future responsiveness as well as the system understanding of this user's preferences.

In this fashion, the identification of which particular viewer or viewers are watching can be used to learn the desired partitioning profile for each user, either individually or by particular groups and to select a preferred partitioning profile based on the viewer or specific group of viewers that are present. Display tiles can be used to present content that is customized to a recognition of which viewers are present. The tiles can include one or more video streams, such as multiple feeds of a single video program or live event, an advertising window, a social window or text messaging window that displays social media communications or group text communication between the viewers and their friends and that can automatically notify friends what viewers are watching in the presentation area of A/V player 104 and what content is being watched.

The decoding module 102, A/V player 104 and the tile processor 120 can each be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. These memories may each be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when decoding module 102, A/V player 104 and the tile processor 120 implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

While system 125 is shown as an integrated system, it should be noted that the system 125 can be implemented as a single device or as a plurality of individual components that communicate with one another wirelessly and/or via one or more wired connections. As described in conjunction with FIGS. 2-4, system 125 can be implemented entirely via a mobile communication device such as a laptop, tablet or smartphone with a back facing camera that serves as a sensor 106.

The further operation of system 125, including illustrative examples and several optional functions and features is described in greater detail in conjunction with FIGS. 6-14 that follow.

Figure 6:
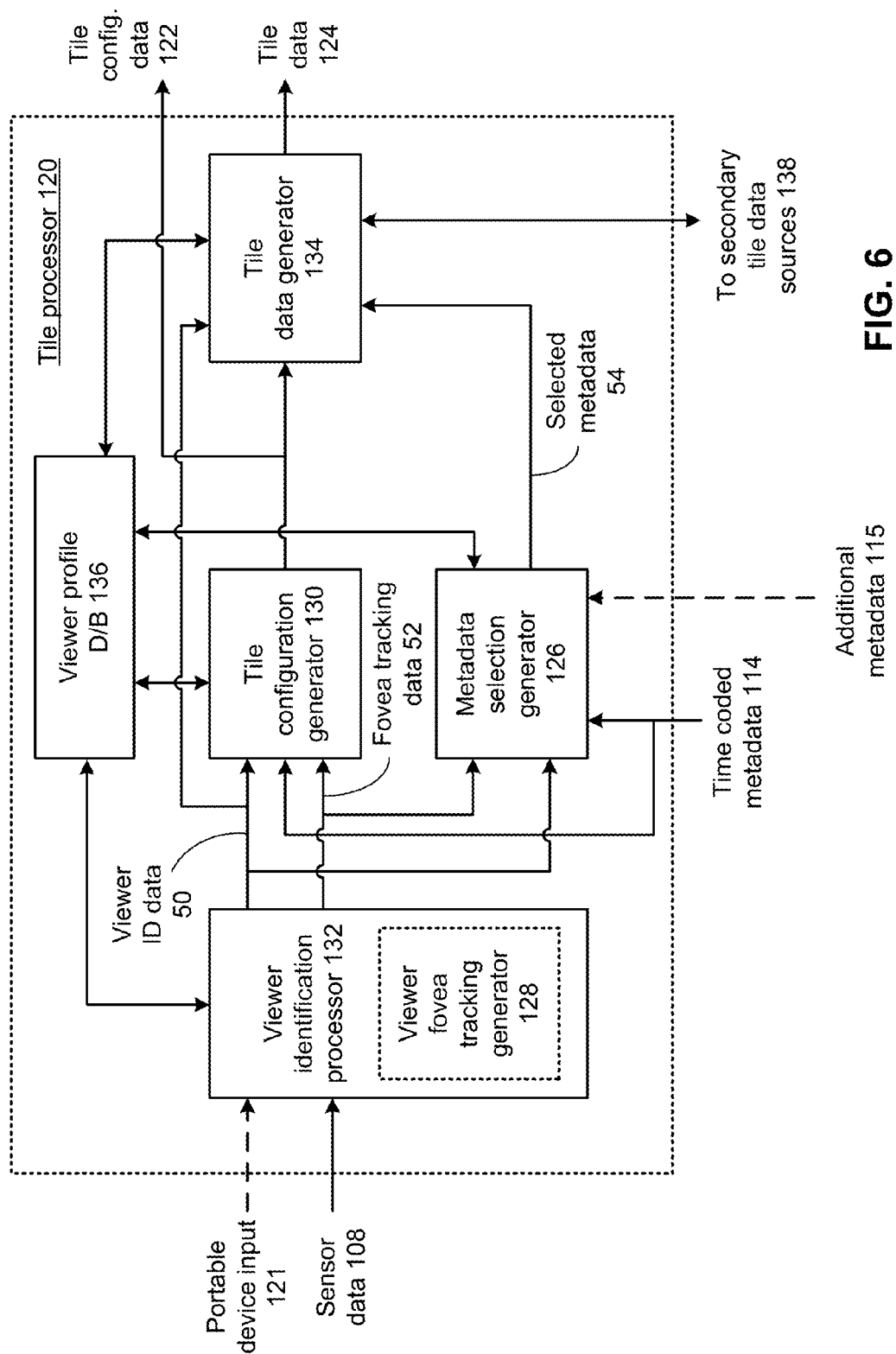
FIG. 6 presents a block diagram representation of a tile processor 120 in accordance with an embodiment of the present disclosure.

FIG. 6 presents a block diagram representation of a tile processor 120 in accordance with an embodiment of the present disclosure. The tile processor includes a viewer identification processor 132 that includes the viewer fovea tracking generator 128, the metadata selection generator 126, a tile configuration generator 130 and a tile data generator 134. As previously discussed, the viewer profile database 136 stores viewer profile data for one or more viewers. The viewer profile data can include viewer images of know viewers and/or other viewer data that can be used to identify the viewers based on the sensor data 108, as well as viewer demographic information, preferred tile configurations for each viewer, portable device information for the portable devices 103 associated with the viewers, and/or other preferences and profile data.

The viewer identification processor 132 analyzes the sensor data 108 and optionally portable device input 121 from one or more portable devices 103 in the viewing area to determine the presence of the viewer(s), to identify the viewer(s) and to generate viewer identification data 50 that indicate the specific viewer or viewers that are present. In an embodiment, the viewer identification processor 132 analyzes the sensor data 108 and/or portable device input 121 to identify the viewer(s) based a comparison of the sensor data 108 or portable device input 121 to viewer profile data stored in a viewer profile database 136. The viewer identification processor 132, via its viewer fovea tracking generator 128, also generates fovea tracking data 52 corresponding to the identified viewer(s) that indicates which of the particular tiled regions of the screen display correspond to a region of viewer focus for each of viewer(s)—i.e. which of the tiled regions each viewer is watching at any given time.

In an embodiment, the viewer identification processor 132 is configured to analyze sensor data 108 generated by one or more viewer sensors 106 corresponding to a viewing of the video program or programs via the A/V player by the viewer(s). For example, a viewer sensor 106 generates sensor data 108 in a presentation area of the A/V player 104. The viewer sensor 106 can include a digital camera such as a still or video camera that is either a stand-alone device, or is incorporated in any one of the devices 10, 20, 30 or 40 or other device that generates the sensor data 108 as image data. In addition or in the alternative, the viewer sensor 106 can include an infrared sensor, thermal imager, background temperature sensor or other thermal imaging sensor, an ultrasonic imaging sensor or other sonar-based sensor, and/or other sensors for generating sensor data 108 that can be used by the viewer identification processor 132 for determining the presence of viewers, for identifying particular viewers, and/or for determining the portions of the screen display, that can be correlated to the particular tiles of the display that the viewers are currently watching. As discussed, the fovea tracking data 52 can indicate the portions of the screen display or particular tiles that that the viewers are currently watching. In addition or in the alternative, image data generated by cameras associated with one or more portable devices 103 and shared as portable device input 121 can be used to identify the viewer(s) along with other portable device input 121 such as the identification of the particular users of each device.

Consider an example where a family is watching TV. One or more video cameras are stand-alone devices or are built into the TV, a set top, Blu-Ray player, and/or portable devices 103 associated with the viewers. The camera or cameras capture video of the presentation environment and viewers. The viewer identification processor 132 processes the video and detects if there are viewers present, how many viewers are present, the identities of each of the viewers to generate viewer identification data 50 and further to determine the focus of interest by each of the viewers to generate fovea tracking data 52 corresponding to the viewer(s).

In an embodiment, the viewer fovea tracking generator 128 tracks that viewers' eyes and/or head to determine the region of the screen display that is being watched by the viewer—an area of viewer focus of the viewer of viewers. As used herein, the area of viewer focus is a prediction of estimation of the region of the screen display corresponding to the viewer's visual fovea—i.e. the portion of the display that is subject to viewer's central vision as opposed to the viewer's peripheral vision. The fovea tracking data 52 is generated to indicate the region of viewer focus in the screen display corresponding to the viewer(s).

The tile configuration generator 130 generates the tile configuration data 122 in response to the viewer identification data 50. The tile configuration data 122 indicates a tiled partitioning of a screen display into a plurality of tiled regions, and further indicates the content to be displayed, either a video program received by the A/V player 104 as received signals 98, or other media. The tile processor 120 can generate the tile configuration data 122 based on the preferred tile configuration for identified viewers retrieved from the viewer profile database. When no profile data is present for a particular viewer, the tile configuration generator 130 can learn the desired partitioning profile for each unknown viewer, As discussed preferred tile configurations can be learned and stored both individually and for particular groups and to select a preferred partitioning profile based on the viewer or specific group of viewers that are present. Consider a family that includes a father, mother, son and daughter. The father and son may both have individual profiles, but a group profile may be learned and stored corresponding to situations when both are watching that may be different from either individual profile.

In addition, time coded-metadata 114 that identifies the content of one or more of the video programs being watched can also be used by the tile configuration generator 130 to determine the tile configuration data 122. Dad may have one profile for sports and another profile for movies. In situations where he is watching a particular football club (Sheffield Wednesday), he might prefer to have separate tiles for multiple feeds of the same game, whereas, when he is watching golf, a single larger tile with a single feed is preferred.

In addition or in the alternative, the tile configuration generator 130 can also adjust the tile configuration data 122 in response to the fovea tracking data 52 to further adapt to the particular tiled region or regions that are currently being watched by the viewer(s). For example, if tiles are presented that are not being viewed, the tile configuration generator 130 can adjust the tile configuration data 122. In an embodiment, the tile configuration generator 130 analyzes the fovea tracking data 52 to consider the percentage of time each tile is viewed and enlarge the tiles that are consistently viewed (having viewing percentages above a first threshold) and reduces or eliminate that tiles that are not being viewed or that are seldom viewed (having viewing percentages below a second threshold).

As discussed, the tile configuration data 122 indicates a tiled partitioning of a screen display into a plurality of tiled regions, and further indicates the content to be displayed, either a video program received by the A/V player 104 as received signals 98, or other media. The A/V player 104 responds to the tile configuration data 122 to fill the video tile regions with corresponding video programs that are received and decoded as the processed video signal(s) 112. For tiles that contain other media, such as messaging, social media, advertisements, or metadata, etc., the tile data generator 134 generates the tile data 124 in response to the particular tile configuration data 122 to provide this other media to the A/V player to fill in these other tiles of the screen display. The tile data generator 134 receives the tile configuration data 122 that indicates the other media to be included in the one or more tiles. The tile data generator 134 receives the viewer ID data 50 and viewer profile data from the viewer profile database 136 to identify advertisements, messaging and social media associated with one or more viewers that are present in conjunction with their viewer profile data. The tile data generator 134 is coupled to secondary tile sources 138, such as messaging server 90, ad server 94 and social media server 96 to retrieve the media required for the current tile configuration to be provided as tile data 124.

In situations where the tile configuration data 122 specifies that one or more tiles are to include metadata, the metadata selection generator 126 selects time coded metadata 114 or metadata associated with the video programs(s) retrieved from a metadata source 92 for display as tile data 124 in accordance with the viewer(s) that are identified. For example, when a viewer's profile indicates an interest in cars, and the time coded metadata indicates the presence of a car in a current scene of a video program being displayed, the metadata selection generator 126 can generate selected metadata 54 that include portions of the time coded metadata 114 relating to cars, and further additional metadata 115 retrieved from the metadata source 92 that provides supplemental media. In addition, when the fovea tracking data 52 for one or more viewers indicate that a particular tiled region with video programming is being watched, the metadata selection generator 126 can select metadata corresponding to the particular video program currently displayed in that tiled region. In this fashion, if multiple video programs are displayed in different tiled regions, metadata can be selected that corresponds to the video program or programs that are currently being followed by the viewer or viewers.

Figure 7:
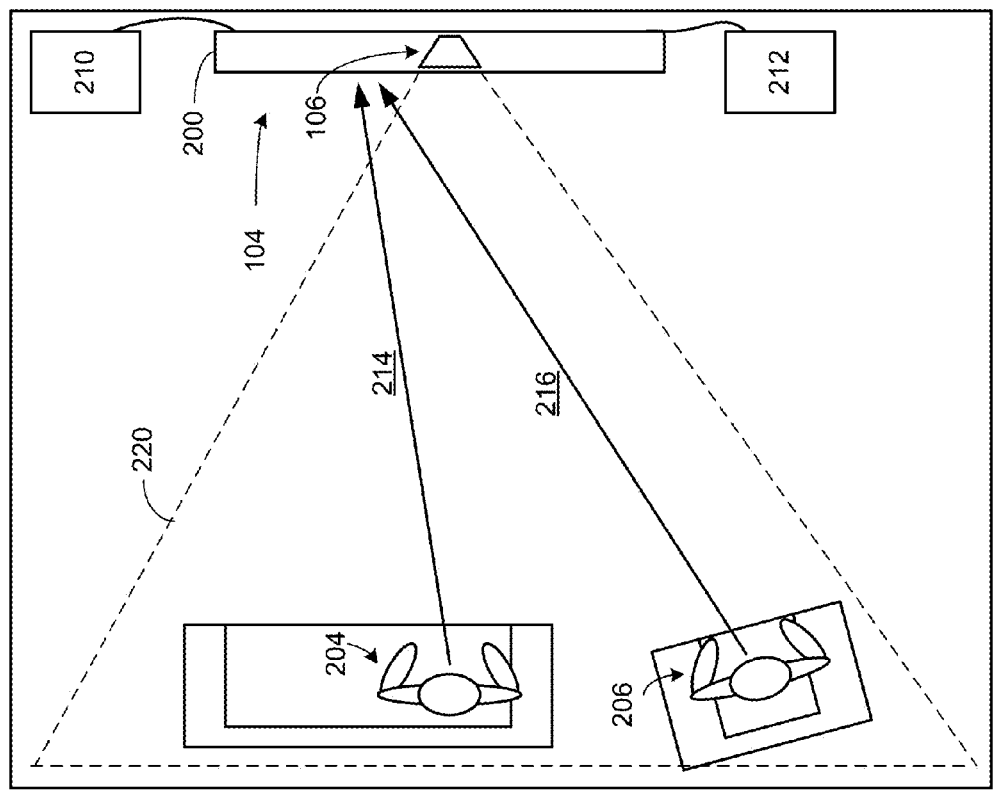
FIG. 7 presents a pictorial representation of a presentation area in accordance with an embodiment of the present disclosure.

FIG. 7 presents a pictorial representation of a presentation area in accordance with an embodiment of the present disclosure. In particular, the use of an example system 125 presented in conjunction with FIGS. 5 and 6 that comprises a home theatre system is shown. The functions and features of system 125 are referred to by common reference numerals as presented in FIGS. 5 and 6.

In this example, a viewer sensor 106 generates sensor data 108 in a presentation area 220 of the A/V player 104. The A/V player 104 includes a flat screen television 200 and speakers 210 and 212. The viewer sensor 106 can include a digital camera such as a still or video camera that is either a stand-alone device, or is incorporated in the flat screen television 200 and that generates sensor data 108. The viewer identification processor 132 analyzes the sensor data 108 to detect and recognize the viewers 204 and 206 of the A/V player 104 and their particular viewing vectors 214 and 216 (in three dimensions). These viewing vectors 214 and 216 can be used to generate the fovea tracking data 52 by determining the regions of viewer interest in the display that correspond to the tile or tiles of the screen display that are being watched by the viewers 204 and 206.

Figure 8:
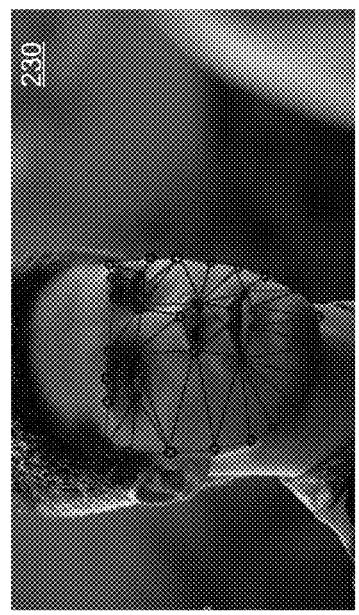
FIG. 8 presents a pictorial representation of a viewer image in accordance with an embodiment of the present disclosure.

FIG. 8 presents a pictorial representation of a video image in accordance with an embodiment of the present disclosure. In particular, a video image 230 is presented that represents an example of image data generated in conjunction with a system, such as system 125, that is described in conjunction with FIGS. 5 and 6. The functions and features of system 125 are referred to by common reference numerals as presented in FIGS. 5 and 6.

In an embodiment, the viewer identification processor 132 generates the viewer ID data 50 and the fovea tracking data 52 based on facial modelling, recognition and tracking of the point of focus on the display device 105 of the viewer's eyes. In an embodiment, the viewer identification processor 132 analyzes the video image 230 included in the sensor data 108 to determine a number of users that are present, the locations of the users, the viewing angle for each of the users and a corresponding region of focus on the display device 105 for each viewer. In the example shown, a single viewer is present.

In one mode of operation, the viewer identification processor 132 analyzes video image 230 together with a skin color model used to roughly partition face candidates. The viewer identification processor 132 identifies and tracks candidate facial regions over a plurality of images (such as a sequence of images of the image data) and detects a face in the image based on the one or more of these images. For example, viewer identification processor 132 can operate via detection of colors in the video image 230. The viewer identification processor 132 generates a color bias corrected image from the image data and a color transformed image from the color bias corrected image. The viewer identification processor 132 then operates to detect colors in the color transformed image that correspond to skin tones. In particular, viewer identification processor 132 can operate using an elliptic skin model in the transformed space such as a $C_bC_r$ subspace of a transformed $YC_bC_r$ space. In particular, a parametric ellipse corresponding to contours of constant Mahalanobis distance can be constructed under the assumption of Gaussian skin tone distribution to identify a facial region based on a two-dimension projection in the $C_bC_r$ subspace. As exemplars, the 853,571 pixels corresponding to skin patches from the Heinrich-Hertz-Institute image database can be used for this purpose, however, other exemplars can likewise be used in broader scope of the present disclosure.

In an embodiment, the viewer identification processor 132 tracks candidate facial regions over a sequence of images and detects a facial region based on an identification of facial motion and/or facial features in the candidate facial region over the sequence of images. This technique is based on 3D human face model that looks like a mesh that is overlaid on the image data. For example, face candidates can be validated for face detection based on the further recognition by viewer identification processor 132 of facial features, such as the shape, size, motion and relative position of face, eyebrows, eyes, nose, mouth, cheekbones and jaw. Any of these facial features extracted from the image data can be used by viewer identification processor 132 to detect each viewer that is present.

Further, the viewer identification processor 132 can employ temporal recognition to extract three-dimensional features based on different facial perspectives included in the plurality of images to improve the accuracy of the detection and recognition of the face of each viewer. Using temporal information, the problems of face detection including poor lighting, partially covering, size and posture sensitivity can be partly solved based on such facial tracking. Furthermore, based on profile view from a range of viewing angles, more accurate and 3D features such as contour of eye sockets, nose and chin can be extracted. Based on the number facial regions that are detected, the number of users present can be identified. In addition, the viewer identification processor 132 can identify the viewing angle of the users that are present and the region of viewer interest in the displayed video program based on the position of the detected faces in the field of view of the image data and their head and/or eye orientations.

Figure 9:
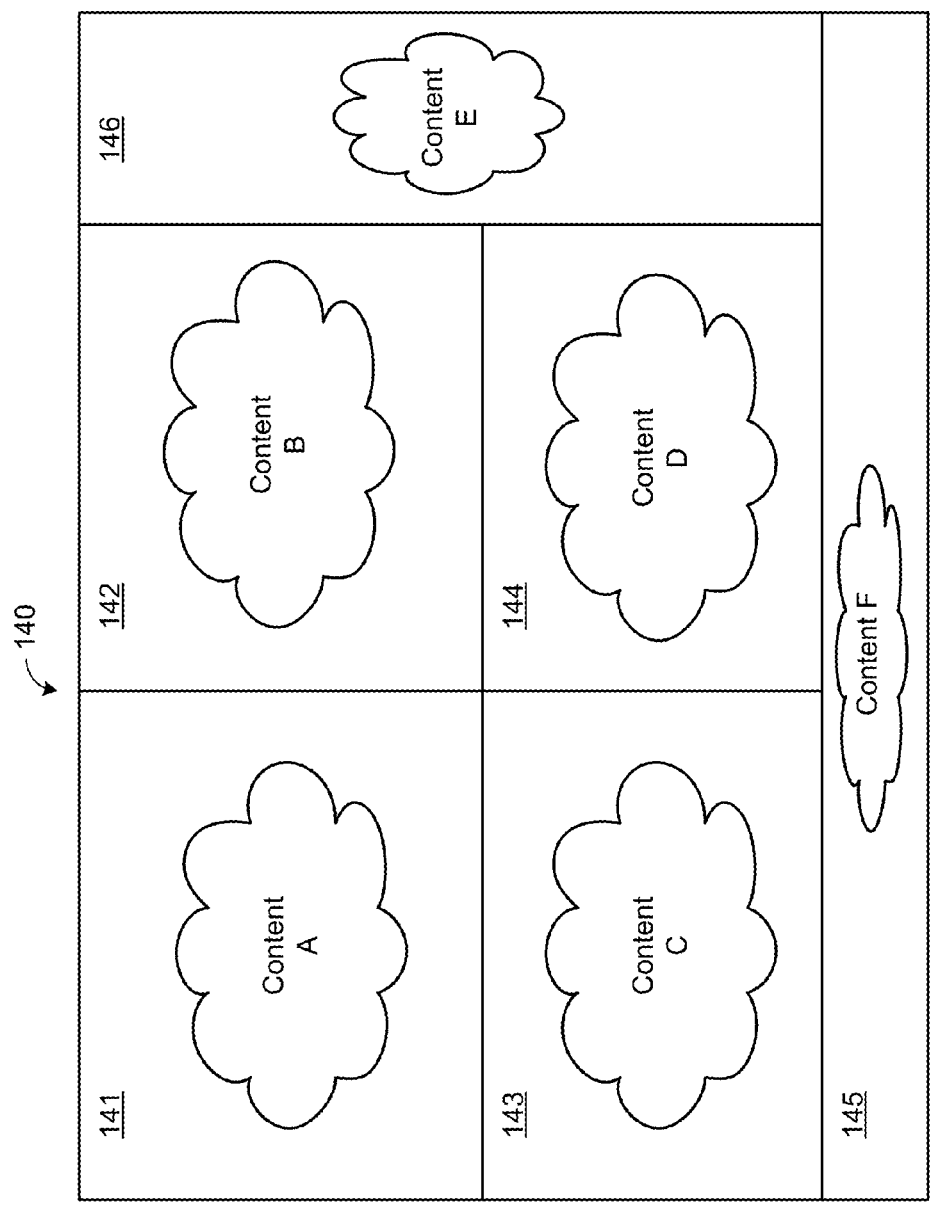
FIG. 9 presents a block diagram representation of a screen display 140 in accordance with an embodiment of the present disclosure.

FIG. 9 presents a block diagram representation of a screen display 140 in accordance with an embodiment of the present disclosure. In particular, a screen display 140 presented by display device 105 is generated in conjunction with a system, such as system 125, is described in conjunction with functions and features of FIG. 5 that are referred to by common reference numerals.

In the example shown, screen display 140 is partitioned into tiles 141, 142, 143, 144, 145 and 146, by tile configuration data 122 that present content A, B, C, D, E and F, respectively. The shape of tiles 141-144 are suited to the display of content in the form of either video programs or other tile data 124 while tiles 145 and 146, based on the shape, are more suited to the display of other tile data 124 such as metadata, messaging data or social media data.

It should be noted that this example presents only one possible partitioning of a screen display into tiles in accordance with tile configuration data 122 and many other possible configurations based on other partitionings and a greater or fewer number of tile are likewise possible.

Figure 10:
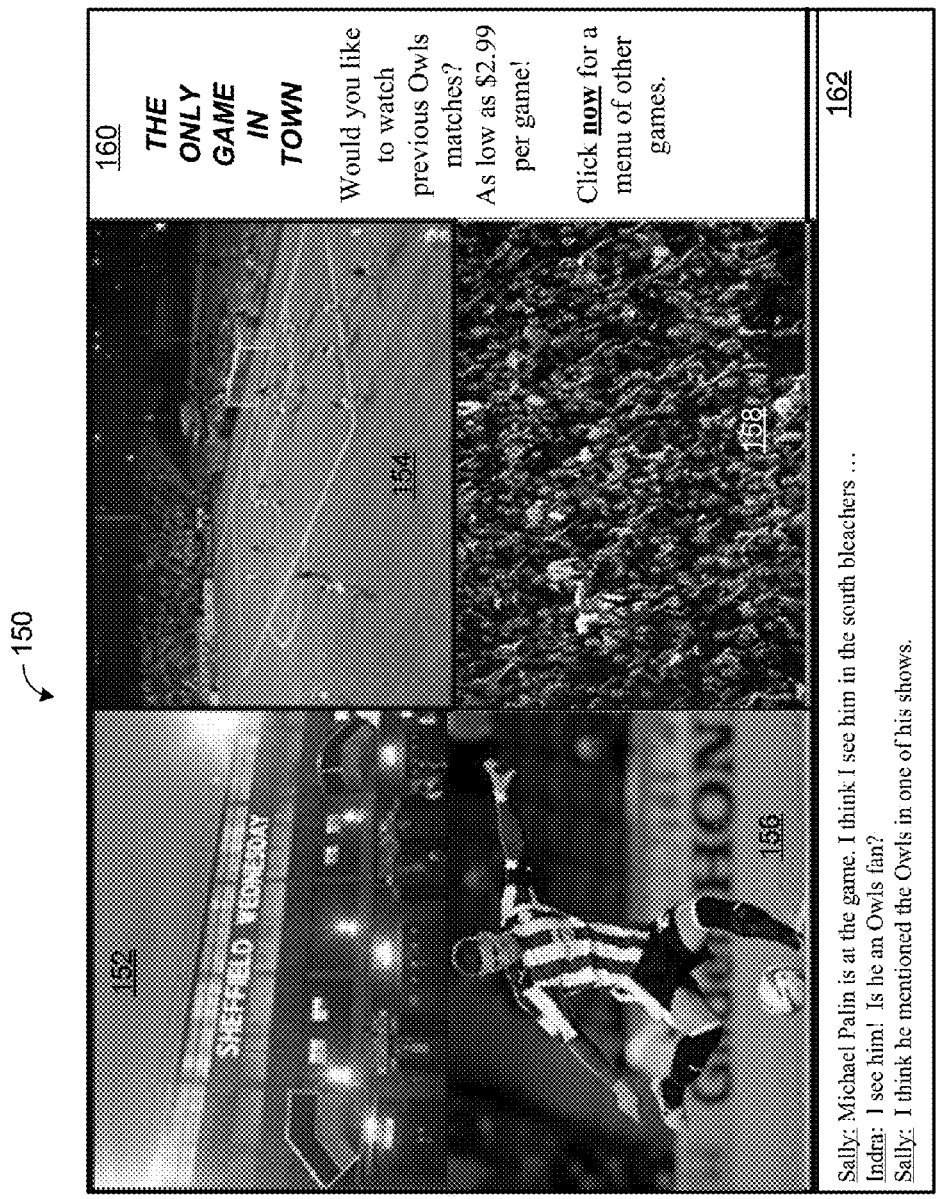
FIG. 10 presents a pictorial representation of a screen display 150 in accordance with an embodiment of the present disclosure.

FIG. 10 presents a pictorial representation of a screen display 150 in accordance with an embodiment of the present disclosure. In particular, a screen display 150 by display device 105 is generated in conjunction with a system, such as system 125, is described in conjunction with functions and features of FIGS. 5 and 6 that are referred to by common reference numerals.

In the example shown, screen display 150 is partitioned in response to tile configuration data 122 into tiles 152, 154, 156, 158, 160 and 162. The tiles 152, 154, 156 and 158 are video tiles that are filled by A/V Player 104 with different contemporaneous video streams of a football match extracted from received signals 98. The A/V player 104 fills the tile 160 with tile data 124 in the form of advertising data, chosen, for example, based on the viewer profile data corresponding to the viewer or viewers and/or based on the content of the video programs being presented in the tiles 152, 154, 156 and/or 158. The A/V player 104 also fills the tile 162 with tile data 124 in the form of messaging data corresponding to messaging from or addressed to one or more of the viewer or viewers. In an embodiment, messages sent and received by the viewers via portable devices 103 during the video program are retrieved via the messaging server 90 and presented for display in tile 162 as shown.

Figure 11:
FIG. 11 presents a pictorial representation of a screen display 170 in accordance with an embodiment of the present disclosure.

FIG. 11 presents a pictorial representation of a screen display 170 in accordance with an embodiment of the present disclosure. In particular, a screen display 170 by display device 105 generated in conjunction with a system, such as system 125, is described in conjunction with functions and features of FIGS. 5 and 6 that are referred to by common reference numerals.

In the example shown, screen display 170 is partitioned in response to tile configuration data 122 into tiles 152, 154, 156, 158, 162, 172 and 174. The tiles 152, 154, 156 and 158 are video tiles that are filled by A/V Player 104 with different contemporaneous video streams of a football match extracted from received signals 98. The A/V player 104 fills the tile 172 with tile data 124 in the form of selected metadata 54, chosen, for example, based on the time coded metadata data 114 or additional metadata 115 corresponding to the video programs being presented in the tiles 152, 154, 156 and/or 158. The A/V player 104 also fills the tile 174 with tile data 124 in the form of Twitter social media data corresponding to social media of viewer or viewers or otherwise corresponding to the content of the time coded metadata data 114 or additional metadata 115. In an embodiment, messages sent and received by the viewers via portable devices 103 during the video program are retrieved via the messaging server 90 and presented for display in tile 162 as shown.

Figure 12:
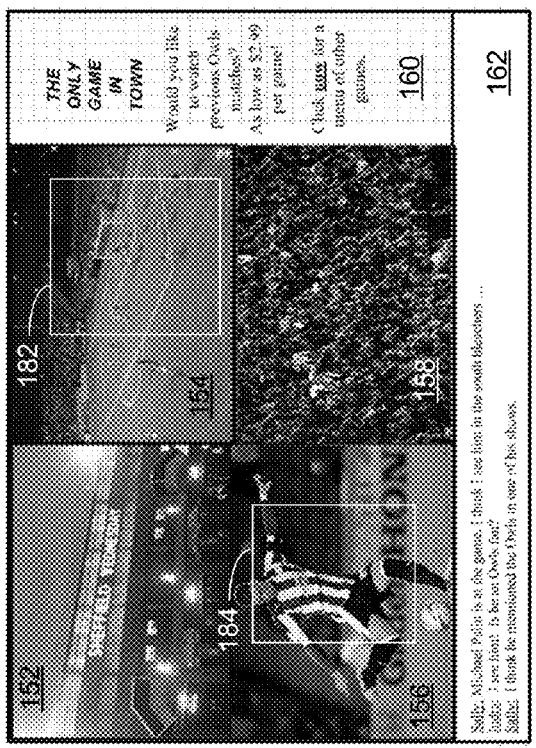
FIG. 12 presents a pictorial representation of a screen display 180 in accordance with an embodiment of the present disclosure.

FIG. 12 presents a pictorial representation of a screen display 180 in accordance with an embodiment of the present disclosure. In particular, a screen display 180 by display device 105 generated in conjunction with a system, such as system 125, is described in conjunction with functions and features of FIGS. 5 and 6 that are referred to by common reference numerals.

In the example shown, screen display 180 is partitioned in response to tile configuration data 122 into tiles 152, 154, 156, 158, 160 and 162. The tiles 152, 154, 156 and 158 are video tiles that are filled by A/V Player 104 with different contemporaneous video streams of a football match extracted from received signals 98. The A/V player 104 fills the tile 160 with tile data 124 in the form of advertising data, chosen, for example, based on the viewer profile data corresponding to the viewer or viewers and/or based on the content of the video programs being presented in the tiles 152, 154, 156 and/or 158. The A/V player 104 also fills the tile 162 with tile data 124 in the form of messaging data corresponding to messaging from or addressed to one or more of the viewer or viewers.

The viewer fovea tracking generator 120 tracks that viewers' eyes and/or head to determine the region of the screen display that is being watched by the viewer—an area of viewer focus of the viewer of viewers. In the example shown there are two viewers (#1 and #2) and the fovea tracking data 52 is generated to indicate the regions of viewer focus 182 and 184 in the screen display—indicating that viewer #1 is currently viewing tile 154 and view #2 is currently viewing tile 156. It should also be noted that neither of the viewers are currently viewing tiles 152 or 158.

As previously discussed, the tile configuration generator 130 can also adjust the tile configuration data 122 in response to the fovea tracking data 52 to further adapt to the particular tiled region or regions that are currently being watched by the viewer(s). For example, if tiles are presented that are not being viewed, the tile configuration generator 130 can adjust the tile configuration data 122. If tiles 152 and 158 are not being viewed more than a threshold percentage of time, they can be eliminated from the partitioning.

Figure 13:
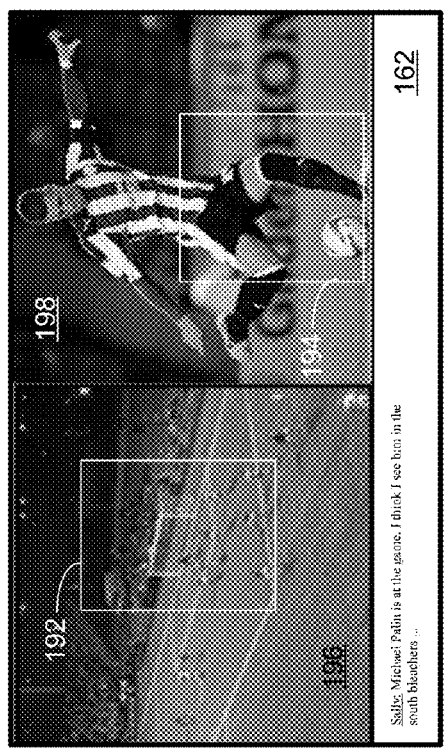
FIG. 13 presents a pictorial representation of a screen display 190 in accordance with an embodiment of the present disclosure.

FIG. 13 presents a pictorial representation of a screen display 190 in accordance with an embodiment of the present disclosure. A screen display 190 by display device 105 generated in conjunction with a system, such as system 125, is described in conjunction with functions and features of FIGS. 5 and 6 that are referred to by common reference numerals. In particular, an example is presented that follows through with the example presented in conjunction with FIG. 12. In this case, the tile configuration generator 130 has adjusted the tile configuration data 122 in response to the fovea tracking data 52 to adjust to the particular tiled region or regions being watched by the viewer(s). Since tiles 152 and 158 presented in conjunction with FIG. 12 were not being viewed more than a threshold percentage of time, they were eliminated from the partitioning. The video program streams presented in the prior tiles 154 and 156 are expended into larger tiles 198 and 196 that remain the focus of viewer interest 192 and 194.

Figure 14:
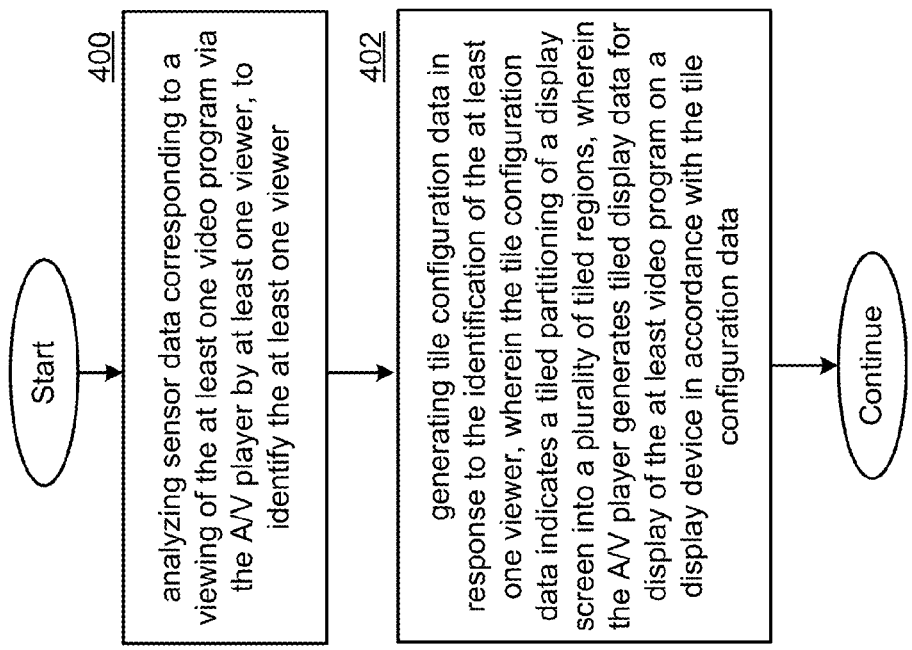
FIG. 14 presents a flowchart representation of a method in accordance with an embodiment of the present disclosure.

FIG. 14 presents a flowchart representation of a method in accordance with an embodiment of the present disclosure. In particular, a method is presented for use in with one or more features described in conjunction with FIGS. 1-13. Step 400 analyzing sensor data corresponding to a viewing of the at least one video program via the A/V player by at least one viewer, to identify the at least one viewer. Step 402 includes generating tile configuration data in response to the identification of the at least one viewer, wherein the tile configuration data indicates a tiled partitioning of a screen display into a plurality of tiled regions, wherein the A/V player generates tiled display data for display of the at least video program on a display device in accordance with the tile configuration data.

The method can further include generating tile data in response to the identification of the at least one viewer, wherein the tile data includes media from at least one secondary tile data source. The plurality of tiled regions can include at least one video region for display of the at least one video program, and at least one other region for display of the tile data. The secondary tile sources can include a social media server or a messaging server.

The method can also include generating tile data in response to the identification of the at least one viewer. The tile data can include metadata associated with the at least one video program. The plurality of tiled regions can include at least one video region for display of the at least one video program and the method can further include generating fovea tracking data corresponding to the at least one viewer, wherein the fovea tracking data indicates at least one of the plurality of tiled regions corresponding to a region of viewer focus in the video program for the at least one viewer. When the at least one of the plurality of tiled regions corresponding to the region of viewer focus in the video program is the at least one video region, the metadata can be selected corresponding to a particular one of the at least one video program currently displayed in the at least one of the plurality of tiled regions.

The method can also include generating fovea tracking data corresponding to the at least one viewer that indicates at least one of the plurality of tiled regions corresponding to a region of viewer focus in the video program for the at least one viewer, and also adjusting the tile configuration data in response to the indication of the at least one of the plurality of tiled regions corresponding to a region of viewer focus in the video program for the at least one viewer.

In an embodiment, the sensor data includes image data. The image data can be analyzed to identify the at least one viewer based a comparison of the image data to at least one viewer image stored in a viewer profile database.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system for use with an audio/video (A/V) player that plays at least one video program from at least one video source, the system comprising:
    at least one sensor configured to generate sensor data corresponding to a viewing of the at least one video program via the A/V player by at least one viewer; and
    a tile processor configured to analyze the sensor data to identify the at least one viewer and to generate tile data and tile configuration data in response to the identification of the at least one viewer, wherein the tile data includes metadata associated with the at least one video program and the tile configuration data indicates a tiled partitioning of a screen display into a plurality of tiled regions which includes at least one video region designated for display of the at least one video program, and at least one other region designated for display of the tile data;
    wherein the tile processor includes a viewer fovea tracking generator configured to generate fovea tracking data corresponding to a plurality of viewers including the at least one viewer, and wherein the fovea tracking data indicates at least one of the plurality of tiled regions corresponding to a region of viewer focus for the plurality of viewers;
    wherein the tile processor updates the tile configuration data to adjust the tiled partitioning to eliminate one of the plurality of tiled regions of the screen display in response to an indication that the plurality of viewers has not viewed the one of the plurality of tiled regions more than a threshold percentage of time, and wherein the tiled partitioning is further adjusted to fill the screen display with remaining ones of the plurality of tiled regions; and
    wherein the A/V player generates tiled display data for display of the at least video program on a display device in accordance with the tile configuration data.

2. The system of claim 1 wherein the tile data further includes media from at least one of: a social media server or a messaging server.

3. The system of claim 2 wherein the tile processor generates a message indicating the at least one video program, and sends the message via at least one of: the social media server or the messaging server.

4. The system of claim 1 wherein the sensor data includes image data and wherein the tile processor analyzes the image data to identify the at least one viewer based on a comparison of the image data to at least one viewer image stored in a viewer profile database.

5. The system of claim 1 wherein the sensor data includes portable device data associated with the at least one viewer and wherein the tile processor identifies the at least one viewer by analyzing the portable device data.

6. The system of claim 1 wherein the tile processor generates the tile configuration data based on viewer profile data corresponding to the at least one viewer that is identified.

7. A method for use with an audio/video (A/V) player that plays at least one video program from at least one video source, the method comprising:
    analyzing sensor data corresponding to a viewing of the at least one video program via the A/V player by at least one viewer, to identify the at least one viewer; and
    generating tile data and tile configuration data in response to the identification of the at least one viewer, wherein the tile data includes metadata associated with the at least one video program and the tile configuration data indicates a tiled partitioning of a screen display into a plurality of tiled regions which includes at least one video region designated for display of the at least one video program, and at least one other region designated for display of the tile data;
    generate fovea tracking data corresponding to a plurality of viewers including the at least one viewer, and wherein the fovea tracking data indicates at least one of the plurality of tiled regions corresponding to a region of viewer focus for the plurality of viewers;
    wherein generating the tile configuration data includes updating the tile configuration data to adjust the tiled partitioning to eliminate one of the plurality of tiled regions of the screen display in response to an indication that the plurality of viewers has not viewed the one of the plurality of tiled regions more than a threshold percentage of time, and wherein the tiled partitioning is further adjusted to fill the screen display with remaining ones of the plurality of tiled regions; and
    wherein the A/V player generates tiled display data for display of the at least video program on a display device in accordance with the tile configuration data.

8. The method of claim 7 further comprising:
    wherein the tile data further includes media from at least one of: a social media server or a messaging server.

9. The method of claim 8 further comprising:
    generating a message indicating the at least one video program; and
    sending the message via at least one of: the social media server or the messaging server.

10. The method of claim 7 wherein the sensor data includes image data and wherein the image data is analyzed to identify the at least one viewer based on a comparison of the image data to at least one viewer image stored in a viewer profile database.

* * * * *